(12) United States Patent
Taniguchi et al.

(10) Patent No.: US 7,095,559 B2
(45) Date of Patent: Aug. 22, 2006

(54) VARIABLE OPTICAL DELAY CIRCUIT

(75) Inventors: Shinji Taniguchi, Kawasaki (JP); Tadao Nakazawa, deceased, late of Zama (JP); Yumi Nakazawa, legal representative, Zama (JP); Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/086,395

(22) Filed: Mar. 23, 2005

(65) Prior Publication Data

US 2005/0231786 A1 Oct. 20, 2005

(51) Int. Cl.
*G02B 27/28* (2006.01)
*G02F 1/03* (2006.01)

(52) U.S. Cl. ............... 359/484; 359/501; 359/283; 359/251; 359/252; 359/254; 359/256; 359/303; 359/304; 385/11; 385/31; 385/39

(58) Field of Classification Search ............ 359/483, 359/484, 494, 497, 501, 280–284, 302, 246, 359/249, 251, 252, 254, 256, 303, 304; 385/31, 385/39, 11
See application file for complete search history.

(56) References Cited

U.S. PATENT DOCUMENTS

| | | | | |
|---|---|---|---|---|
| 5,432,637 A | * | 7/1995 | Hakimi | 385/11 |
| 5,812,304 A | | 9/1998 | Shirasaki et al. | 359/324 |
| 6,330,117 B1 | * | 12/2001 | Seo | 359/281 |
| 6,339,661 B1 | * | 1/2002 | Kokkelink et al. | 385/11 |
| 6,404,537 B1 | * | 6/2002 | Melman et al. | 359/251 |
| 6,515,786 B1 | * | 2/2003 | Xia et al. | 359/256 |
| 6,590,706 B1 | * | 7/2003 | Xie et al. | 359/495 |
| 6,822,793 B1 | * | 11/2004 | Xie et al. | 359/484 |
| 7,006,273 B1 | * | 2/2006 | Sahashi et al. | 359/280 |
| 2002/0110306 A1 | * | 8/2002 | Hamada | 385/11 |
| 2002/0171905 A1 | * | 11/2002 | Liu et al. | 359/256 |

FOREIGN PATENT DOCUMENTS

| | | |
|---|---|---|
| JP | 4-116602 | 4/1992 |
| JP | 5-34633 | 2/1993 |
| JP | 5-313094 | 11/1993 |
| JP | 6-67219 | 3/1994 |

(Continued)

OTHER PUBLICATIONS

K. Ikeda, et al., "Arbitrary Polarization Generator with Variable Faraday Rotator", Electronic Information Communication Academy, Mar. 7, 2002, p. 549.

(Continued)

*Primary Examiner*—Evelyn A. Lester
(74) *Attorney, Agent, or Firm*—Staas & Halsey LLP

(57) ABSTRACT

In a variable optical delay circuit to be used for compensation for polarization mode dispersion of an optical signal and for other purposes, there are provided a first birefringent member, a second birefringent member and a variable optical rotator interposed between the first birefringent member and the second birefringent member for varying a polarization state of light outputted from the first birefringent member. The birefringent members and the variable optical rotator are disposed on the same optical axis, and the optical axis of each of the birefringent members is set to perpendicularly intersect a traveling direction of inputted light. Therefore, by varying the optical rotation angle of the variable optical rotator, an arbitrary delay quantity corresponding thereto is obtainable in a continuous (analog-like) fashion without undergoing spatial separation between polarization components of the inputted light and varying the intensity (loss) of each of the polarization components.

10 Claims, 11 Drawing Sheets

FOREIGN PATENT DOCUMENTS

| | | |
|---|---|---|
| JP | 6-250121 | 9/1994 |
| JP | 9-61770 | 3/1997 |
| JP | 9-288256 | 11/1997 |
| JP | 2000-330079 | 11/2000 |
| JP | 2002-228996 | 8/2002 |

OTHER PUBLICATIONS

F. Heismann, "Polarization Mode Dispersion: Fundamentals and Impact on Optical Communication Systems", Proc. ECOC '98, Tutorials, pp. 51-79.

* cited by examiner

VARIABLE OPTICAL DELAY CIRCUIT

CROSS REFERENCE TO RELATED APPLICATIONS

This application is based on and hereby claims priority to International Application No. PCT/JP2003/001110 filed on 4 Feb., 2003 in Japan, the contents of which are hereby incorporated by reference.

BACKGROUND OF THE INVENTION (1) Field of the Invention

The present invention relates to a variable optical delay circuit, for example, a variable optical delay circuit available as a variable differential group delay (DGD: Differential Group Delay) compensator designed to compensate for a delay between two polarization modes perpendicularly intersecting each other for the polarization mode dispersion compensation in an optical communication system.

(2) Description of Related Art

For the recent large-capacity transmission, there has been taken up the problems of polarization mode dispersion (PMD: Polarization Mode Dispersion). In particular, it has been said that the PMD compensation is essential in a 40-Gbps (Giga bits per second) system.

Although a linearly-polarized optical signal pulse train ideally incident on an axisymmetric optical fiber is detectable in a state of linearly polarization even after a long-distance transmission, in fact a core distortion of an optical fiber occurs due to difference in manufacturing of optical fibers or variations of installation environments with time. This principally causes a split of a linearly polarization into two polarization components [a polarization component (horizontal polarization) whose vibrational vector is parallel with a plane of incidence and a polarization component (vertical polarization) perpendicular thereto] which perpendicularly intersect each other at an exit of the optical fiber, and a difference in speed between the polarization components develops, thus making it difficult to accomplish the normal detection of an optical signal pulse.

In general, the PMD compensation is carried out through the use of a polarization controller and an optical delay circuit. That is, a polarization controller is made to adjust the polarization direction of an optical signal while a variable optical delay circuit has a function to cancel the speed difference between two polarization components developing during the optical fiber transmission as mentioned above.

As a concrete example, FIG. 10 shows a configuration of a conventional variable optical delay circuit proposed in Japanese Patent Laid-Open No. HEI 6-67219. The variable optical delay circuit shown in FIG. 10 has a basic structure in which sets of polarization plane control devices 300-1 to 300-N (N represents an integer equal to or more than 2) and polarization beam splitters (PBS: Polarization Beam Splitter) 400-1 to 400-N and 500-1 to 500-N are alternately disposed at a plurality of stages, and one (for example, horizontal polarization) of an incident beam 101 having two polarization components which perpendicularly intersect each other is reflected through a polarization beam splitter 100 toward a ½-waveplate 200 side and the polarization plane control elements 3-$i$ ($i$=1 to N) selectively determines a set of the polarization beam splitters 400-$i$ and 500-$i$ (in FIG. 10, a set comprising the polarization beam splitters 400-2 and 500-2) to be used for reflexing the incident beam 101 (horizontal polarization), thus varying the optical path length of the incident beam 101 according to polarization components perpendicularly intersect each other for providing an appropriate delay.

Therefore, in this case, the optical path length varies in a stepwise (digital-like) fashion and, hence, the compensation quantity varies in a digital-like fashion. Incidentally, the aforesaid ½-waveplate 200 has a function to make a conversion of horizontal polarization→vertical polarization with respect to the incident beam 101 inputted from the polarization beam splitter 100 and further to make a conversion of vertical polarization→horizontal polarization with respect to the incident beam 101 inputted from the polarization plane control device 300-1. The incident beam 101 converted into the horizontal polarization is reflected by a polarization beam splitter 900 to be outputted in the same direction as the direction of the incidence on the polarization beam splitter 101.

In addition, as a conventional variable optical delay circuit, for example, there has been known a circuit shown in FIG. 11. The variable optical delay circuit shown in FIG. 11 is proposed in the document "F. Heismann, "Polarization mode dispersion: fundamentals and impact on optical communication systems.", Proc. ECOC '98, Tutorials, pp. 51–79." wherein a polarization beam splitter 600 splits an incident beam into two polarization components (horizontal and vertical polarizations), with one (for example, horizontal polarization) being outputted intact to a polarization multiplexer 700 while the other (vertical polarization) being outputted to a reflecting mirror 801.

Moreover, the vertical polarization beam reflected on the reflecting mirror 801 is successively reflected in the order of a reflecting mirror 802, a reflexing mirror 803 and a reflecting mirror 804 to be incident on the polarization multiplexer 700 after passing through an optical path different from that of the one horizontal polarization beam, where it is coupled with the horizontal polarization beam. In this case, the reflexing mirror 803 is of a movable type whereby the relative distance therefrom to the reflecting mirror 802 is mechanically adjustable (movable).

Therefore, the optical path length of the vertical polarization beam varies in accordance with the movement quantity of the reflexing mirror 803 and, hence, the delay quantity (compensation quantity) corresponding thereto is attainable.

However, in the case of the conventional variable optical delay circuit mentioned above with reference to FIG. 10, since the compensation quantity varies in a digital-like fashion, difficulty is experienced in compensating continuously for arbitrary DGD. In addition, a characteristic degradation occurs due to variation in refractive index of optical parts such as the polarization beam splitters 100, 400-$i$ and 500-$i$ which stems from variation in ambient temperature.

Furthermore, in the conventional variation optical delay circuit mentioned above with reference to FIG. 11, the mechanical movement of the reflexing mirror 803 leads to a lowered response speed and a lowered stability and further to an increase in apparatus scale. Moreover, not only a difference in loss appears in each optical path, i.e., between the horizontal polarization and the vertical polarization, but also the loss difference varies depending upon the delay quantity.

Incidentally, among other conventional techniques, there are, for example, (1) a variable optical attenuator proposed in Japanese Patent Laid-Open No. HEI 9-288256, (2) an optical isolator proposed in Japanese Patent Laid-Open No. HEI 6-250121, (3) an optical circulator proposed in Japanese Patent Laid-Open No. HEI 5-34633, (4) an optical isolator proposed in Japanese Patent Laid-Open No. HEI 5-313094, and others.

Each of these techniques takes advantage of the characteristic of a doubly refracting crystal which can spatially separate polarization components perpendicularly crossing each other. That is, for example, as illustratively shown in FIG. 12, when an anisotropic axis (equally referred to as an optical axis or crystal axis) of a doubly refracting crystal is disposed so as to make an angle of approximately 45 degrees with respect to a traveling direction of inputted light, the inputted light is spatially separated into an ordinary light component (for example, a component in a direction perpendicular to the paper surface) 111 and an extraordinary light component (for example, a component parallel to the paper surface) 112. It takes advantages of this characteristic.

Concretely, for example, this is written in the paragraphs 0017 to 0021 and FIGS. 2 and 3 in the aforesaid (1), the paragraph 0018 in the aforesaid (2), the paragraphs 0011 to 0013 and FIG. 3 in the aforesaid (3), and the paragraph 0012 and FIGS. 1 and 2 in the aforesaid (4), and others.

However, because of spatially separating the polarization components perpendicularly intersecting each other, these techniques cannot produce a function as a variable delay circuit, although they can provide a variable optical attenuator, an optical isolator and an optical circulator. Moreover, the difference in optical path between the polarization components causes a loss difference.

SUMMARY OF THE INVENTION

The present invention has been developed in consideration of the above-mentioned problems, and it is an object of the invention to provide a variable optical delay circuit capable of achieving continuous compensation in quantity and preventing the occurrence of a difference in loss between the polarizations.

For achieving the above-mentioned purpose, a variable optical delay circuit according to the present invention comprises a first birefringent member, a second birefringent member and a variable optical rotator provided between the first birefringent member and the second birefringent member for varying a polarization state of an outputted light from the first birefringent member, with the birefringent members and the variable optical rotator being disposed on the same optical axis, and each of optical axes of the birefringent members being set so as to perpendicularly or almost perpendicularly intersect a traveling direction of inputted light.

In this case, preferably, the aforesaid first birefringent member and/or second birefringent member are constructed as a doubly refracting crystal group having two or more doubly refracting crystals, and these doubly refracting crystals have a characteristic to cancel a variation of double refraction due to temperature variation as a whole.

In addition, it is also appropriate that one or more sets each comprising a different variable optical rotator and a different birefringent member are provided on the optical axis at a latter stage of the second birefringent member so that an optical axis of the different birefringent member is disposed so as to perpendicularly or almost perpendicularly intersect a traveling direction of inputted light.

Furthermore, a variable optical delay circuit according to the present invention comprises a birefringent member, a variable optical rotator for varying a polarization state of an outputted light from the birefringent member, and a reflecting mirror for reflecting the outputted light from the variable optical rotator toward the variable optical rotator and the birefringent member, with the birefringent member, the variable optical rotator and the reflecting mirror being disposed on the same optical axis, and an optical axis of the birefringent member being set so as to perpendicularly or almost perpendicularly intersect a traveling direction of inputted light.

In this case, preferably, the aforesaid birefringent member is constructed as a doubly refracting crystal group having two or more doubly refracting crystals and these doubly refracting crystals have a characteristic to cancel a variation of double refraction due to temperature variation as a whole.

Moreover, it is also appropriate that one or more sets each comprising a different birefringent member and a different variable optical rotator are provided on the optical axis between the aforesaid variable optical rotator and the aforesaid reflecting mirror so that the optical axis of the different birefringent member is disposed so as to perpendicularly or almost perpendicularly intersect a traveling direction of inputted light.

Still moreover, it is also appropriate that the aforesaid variable optical rotator includes a Faraday rotator, a permanent magnet for generating a parallel magnetic field in a direction parallel to an optical axis of the Faraday rotator, and an electromagnet for generating a perpendicular magnetic field in a direction perpendicular to the optical axis of the Faraday rotator so that the polarization state of the inputted light is made variable by controlling the strength of a synthetic magnetic field of the parallel magnetic field and the perpendicular magnetic field through the use of a drive current directed at the electromagnetic.

Yet moreover, preferably, the magnetization to be made in an optical-axis direction by the permanent magnet is set to reach a saturation.

DESCRIPTION OF THE PREFERRED EMBODIMENTS

[A] Description of First Embodiment

Figure 1:
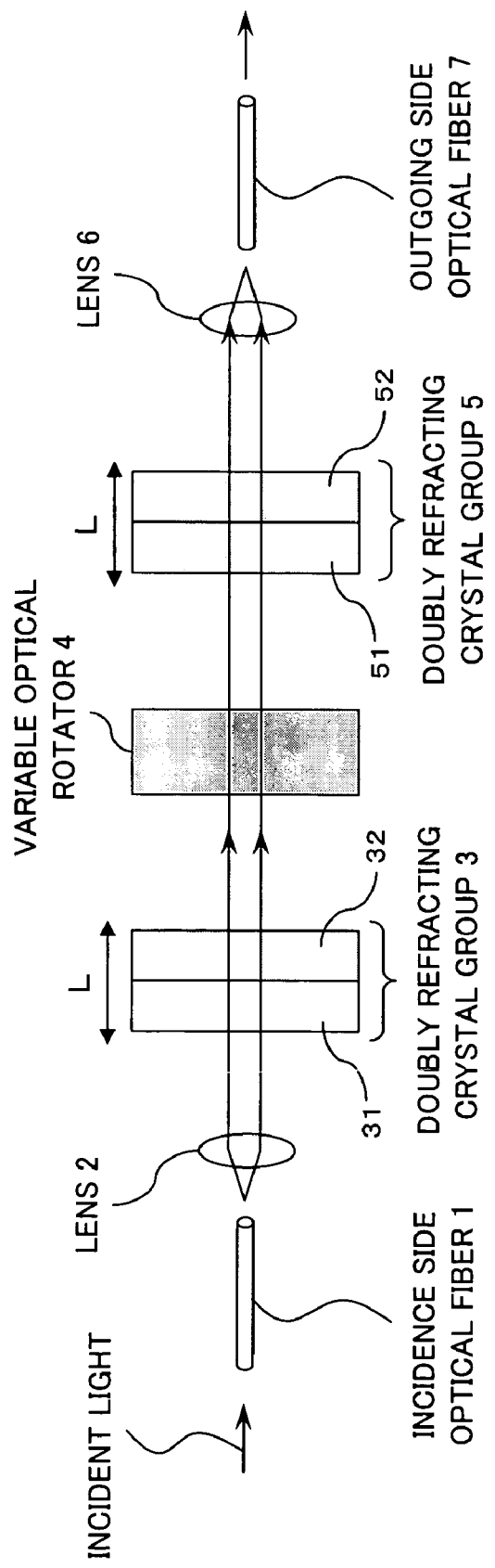
FIG. 1 is a block diagram showing a configuration of a variable DGD compensator (variable optical delay circuit) according to a first embodiment of the present invention.

FIG. 1 is a block diagram showing a configuration of a variable DGD compensator (variable optical delay circuit) according to a first embodiment of the present invention. The variable DGD compensator shown in FIG. 1 includes a collimating lens 2 for collimating light incident from an incidence side optical fiber 1, an input side (first) doubly refracting crystal group (birefringent member) 3, a variable optical rotator 4, an output side (second) doubly refracting crystal group (birefringent member) 5, and a collective lens 6 for condensing light outputted from the doubly refracting crystal group 5 and collecting it toward an outgoing side optical fiber 7, with these components being disposed on the same optical axis.

In this configuration, each of the doubly refracting crystal groups 3 (5) is for creating a propagation velocity (group velocity) in accordance with a polarization state of incident light and, in this embodiment, for example, it is constructed by combining two doubly refracting crystals 31 and 32 (51 and 52) whose polarities on variation of double refraction according to temperature variation are positive and negative so that the temperature dependence of the double refraction is canceled in the doubly refracting crystal group 3 (5) as a whole.

The doubly refracting crystals 31 and 32 (51 and 52) constituting the doubly refracting crystal groups 3 (5) are disposed such that the anisotropic axes (optical axes) thereof coincide with each other. Moreover, the anisotropic axes (equally referred to as optical axes or crystal axes) of the doubly refracting crystal groups 3 and 5 are disposed to coincide with each other or at an angle corresponding to an angle of rotation of the variable optical rotator 4 and disposed to be perpendicular or almost perpendicular to a traveling direction of inputted light (see FIG. 2). In this case, the "almost perpendicular" signifies, in consideration of the adverse influence due to reflection, that it is also acceptable to employ an arrangement in which the optical axis is shifted by approximately several degrees from the completely perpendicular condition. In the following description, the case of merely using "perpendicular" includes the "almost perpendicular". Moreover, an AR coat can also be used in order to eliminate the adverse influence of the reflection.

Figure 2:
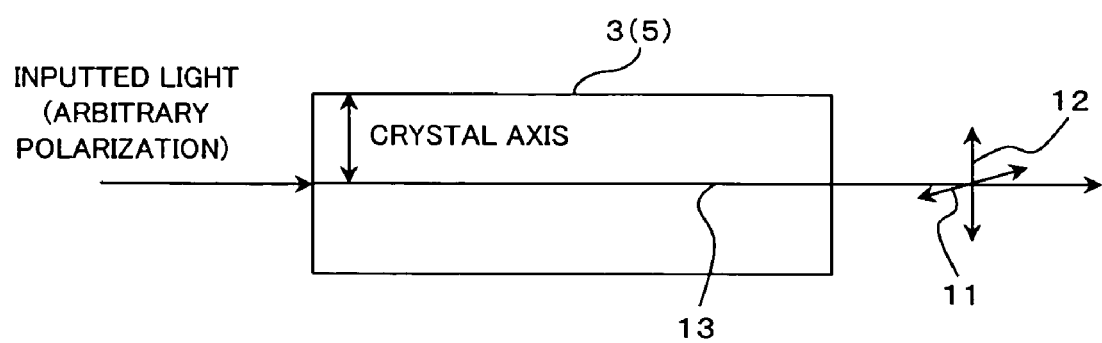
FIG. 2 is a block diagram for explaining a disposition of a doubly refracting crystal group shown in FIG. 1.

As shown in FIG. 2, the above-mentioned disposition of the crystal axes separates, in the doubly refracting crystal group 3 (5), the inputted light into two polarization components (ordinary light and extraordinary light) 11 and 12 perpendicularly crossing each other, and both propagate on the same optical axis 13 (the respective polarization components are not spatially separated from each other).

In addition, the relationship expressed by the following equation (1) lies among the length L of the doubly refracting crystal groups 3 and 5 in the optical-axis direction, the doubly refractive index Δn of the doubly refracting crystal groups 3 and 5 and the required maximum delay quantity (compensation quantity) τ (however, in a case in which the lengths of the doubly refracting crystal group 3 and the doubly refracting crystal group 5 in an optical-axis direction are set at the same length L).

$$\tau = 2\Delta n \cdot L / C_0 \quad (1)$$

In this equation (1), $C_0$ denotes the velocity of light. This requires only that the length L of the doubly refracting crystal groups 3 and 5 in the optical-axis direction is set at a value equal to or more than a length which can realize the needed maximum delay quantity τ.

Figure 5:
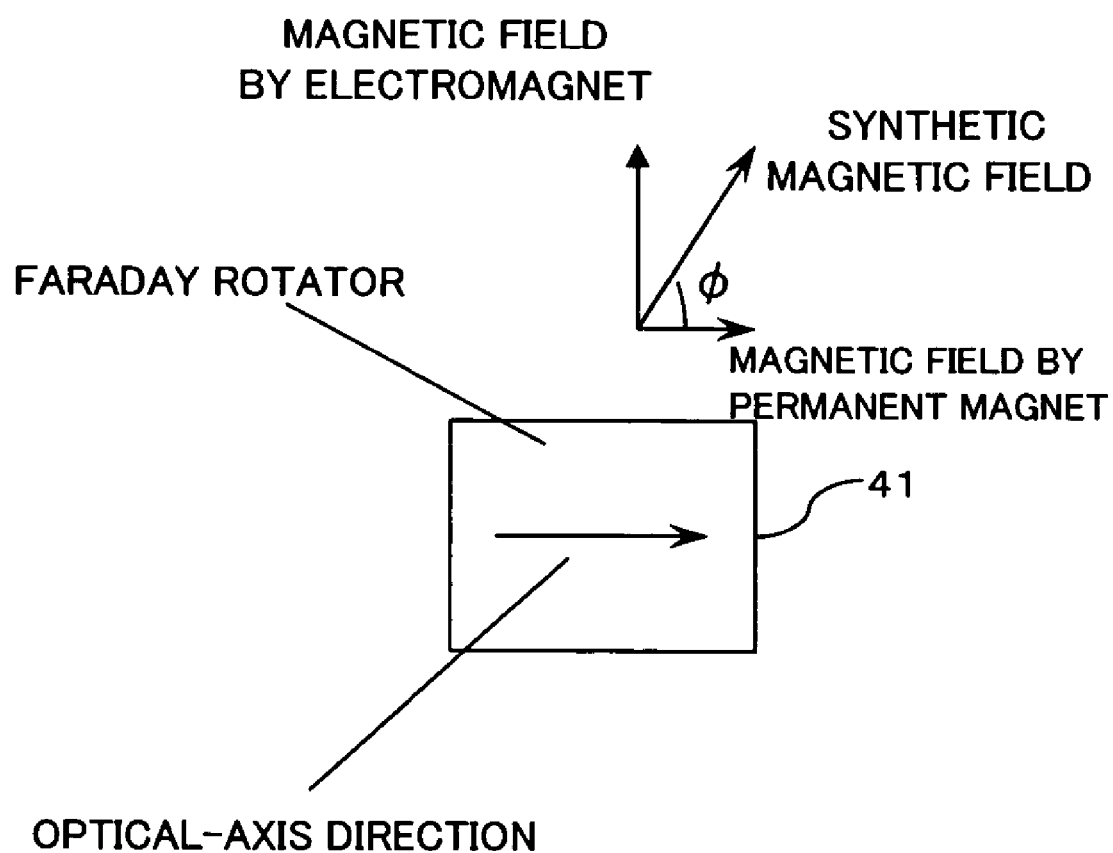
FIG. 5 is illustrative view for explaining a variable Faraday rotator to be used as a variable optical rotator shown in FIG. 1.

The variable optical rotator 4 is for making the polarization state of the outputted light from the doubly refracting crystal group 3 variable and, for example, it is constructed with a variable Faraday rotator 41 (see FIG. 5). To this variable Faraday rotator (which will hereinafter be referred to simply as a "Faraday rotator") 41, a magnetic field originating from a permanent magnet is applied in a direction parallel to the optical-axis direction and a magnetic field originating from an electromagnet is further applied in a direction perpendicular to the optical axis. In a manner such that the setting is made so that the magnetization originating from the permanent magnet in the optical-axis direction reaches a saturation, the Faraday rotation angle reaches a maximum at no application of a current to the electromagnet. Moreover, an increase/decrease in applied current to the electromagnet varies the direction (an angle relative to the optical axis is taken as φ) of the synthetic magnetic field originating from the permanent magnet and the electromagnet and the strength thereof, thus varying the Faraday rotation angle (optical rotation angle) in proportion to cos φ.

Incidentally, the reason for setting so that the magnetization in the optical-axis direction by the permanent magnet reaches a saturation is to achieve the stable reproducibility on the Faraday rotation angle. That is, in a Faraday element, the directions of the magnetic domains does not become even in the case of below the saturated magnetization so that irregular light scattering occurs to produce a loss and the control becomes difficult because of showing a large hysteresis or for other reasons. Moreover, the compensation for the temperature dependence of the Faraday rotation angle is feasible, for example, in a manner such that the current control on the electromagnet is carried out in accordance with the previously obtained temperature characteristics of an applied current value and a rotation angle.

In addition, the response of the Faraday rotation is fast and a response speed of approximately several hundreds microseconds is attainable, which enables high-speed operation. Still additionally, the Faraday rotator 41 does not originally include a mechanically driven portion, which can realize a variable DGD compensator with high long-term stability and can prevent the occurrence of a difference in loss between polarizations by employing an optical crystal whose polarization dependence on loss is negligible.

A description will be given hereinbelow of an operation of the variable DGD compensator according to this embodiment, constructed as described above.

An optical signal suffering from DGD is incident from the incidence side optical fiber 1 onto the collimating lens 2 and, after collimated by the collimating lens 2, passes through the doubly refracting crystal group 3, the variable optical rotator 4 and the doubly refracting crystal group 5 so that it is finally condensed at the outgoing side optical fiber 7 through the collective lens 6. Thus, the optical signal undergoing the DGD compensation propagates.

Let it be assumed that the lengths L of the doubly refracting crystal groups 3 and 5 in the optical-axis direction are set to be equal to each other and the optical rotation angle of the variable optical rotator 4 is 0 degree in a state where the anisotropic axes (optical axes) of the doubly refracting crystal groups 3 and 5 are disposed to agree with each other.

Figure 3:
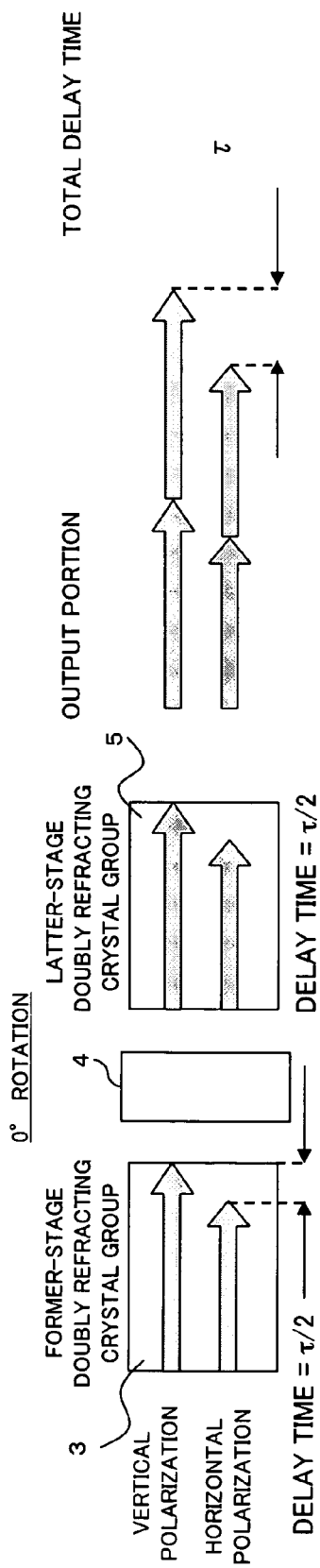
FIGS. 3 and 4 are illustrative views for explaining an operation of the variable DGD compensator shown in FIG. 1.

In this case, as illustratively shown in FIG. 3, an optical signal suffering from DGD is separated into two polarization components perpendicularly intersecting each other in the doubly refracting crystal group 3 with the input side length L, and a delay quantity (optical delay value) $\tau_1$ ($=\tau/2$) corresponding to the double refraction is obtainable after the propagation by the length L. That is, since a difference in the refractive index sensible in the doubly refracting crystal group 3 exists between the polarization components perpendicularly intersecting each other, a difference in group velocity occurs between the polarization components (in FIG. 3, the vertical polarization component goes ahead).

In this connection, at this time, since the optical axis of the doubly refracting crystal group 3 is set to be perpendicular to a traveling direction of the inputted light, the separated polarization components propagate on the same optical axis in the doubly refracting crystal group 3, and a difference in optical path does not occur. This signifies that the time delay of each of the polarization components is adjustable without varying the intensity of each of the polarization components.

Following this, each of the polarization components is incident on the variable optical rotator 4 (Faraday rotator 41) and, at this time, since the Faraday rotation angle of the Faraday rotator 41 is 0 degree (no optical rotation occurs), a compensation quantity (optical delay value) $\tau_2$ ($=\tau/2$) equal to that in the doubly refracting crystal group 3 is obtainable also in the output side doubly refracting crystal group 5 and, in consequence, the maximum delay quantity $\tau$ ($=\tau_1+\tau_2$) to be obtained by the aforesaid equation (1) is attainable.

Figure 4:
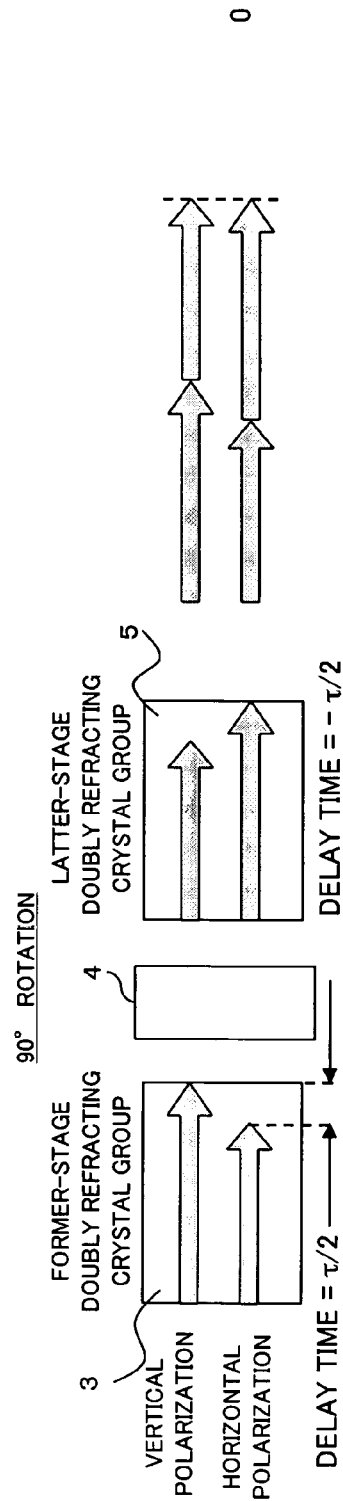

On the other hand, in a case in which the optical rotation angle to be made by the variable optical rotator 4 is ±90 degrees, as illustratively shown in FIG. 4, the compensation quantities $\tau_1$ ($=\tau/2$) and $\tau_2$ ($=-\tau/2$) of the doubly refracting crystal groups 3 and 5 cancel each other so that the minimum delay quantity $\tau=0$ is obtainable.

Figure 6:
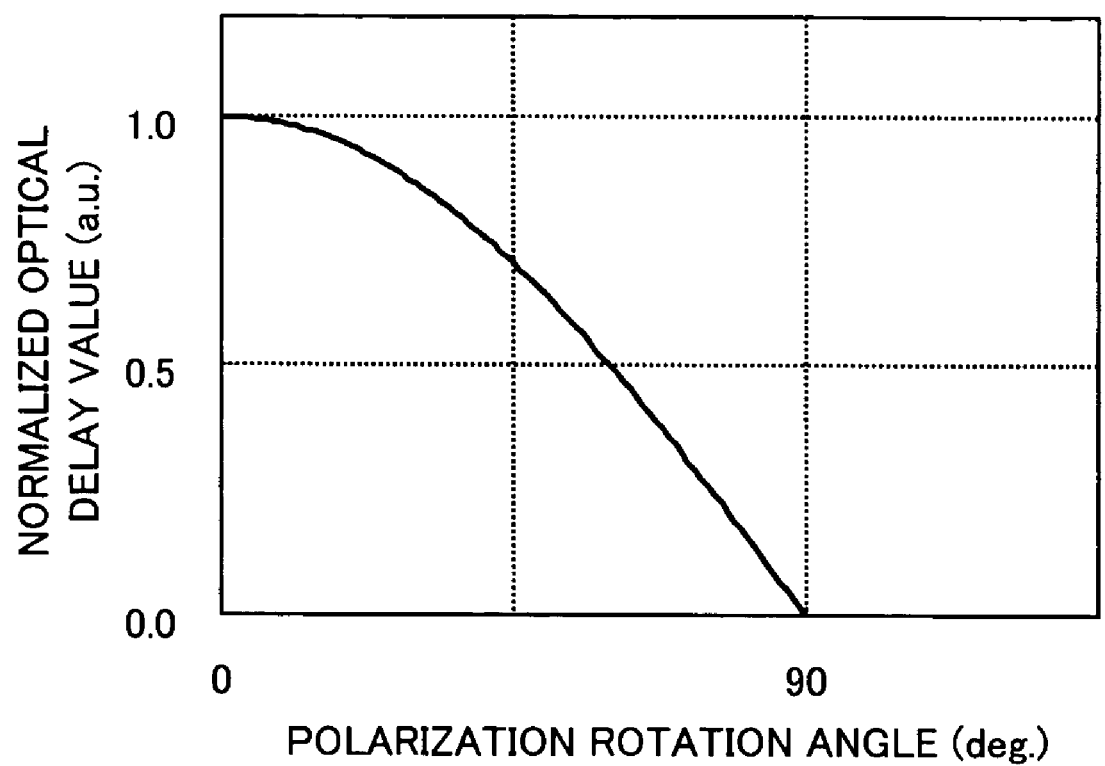
FIG. 6 is a graphic illustration for explaining an operation of the variable DGD compensator, shown in FIG. 1, with respect to a polarization rotation angle.

Therefore, when the optical rotation angle is 0 to +90 (or −90) degrees, for example, as shown in FIG. 6, the delay quantity (optical delay value) varies in a continuous (analog-like) fashion in accordance with the optical rotation angle (Faraday rotation angle) of the variable optical rotator 4 (Faraday rotator 41). Although the values shown in FIG. 6 are calculated values (theoretical values), the inventor of the present application confirmed that they also match with the experimental values.

Incidentally, in a case in which the anisotropic axes (optical axes) of the doubly refracting crystal groups 3 and 5 are disposed so as to perpendicularly intersect each other, this makes an inverse relationship with respect to the above-mentioned relationship. That is, when the optical rotation angle of the variable optical rotator 4 is 0 degree, like the case shown in FIG. 4, the compensation quantities of the doubly refracting crystal groups 3 and 5 cancel each other so that the minimum delay quantity $\tau=0$ is obtainable. Moreover, when the optical rotation angle is ±90 degrees, like the case shown in FIG. 3, the maximum delay quantity $\tau$ is obtainable.

As described above, with the variable DGD compensator according to this embodiment, the optical rotation angle of the variable optical rotator 4 is made variable, thus providing an arbitrary delay quantity corresponding thereto in a continuous (analog-like) fashion. Moreover, the different polarization components propagate on the same optical path (optical axis) without being spatially separated, which prevents the intensities of the polarization components from varying and prevents a loss difference from occurring between the polarization components.

Still moreover, since each of the doubly refracting crystal groups 3 and 5 is constructed by combining two doubly refracting crystals 31 and 32 (51 and 52) respectively showing positive and negative polarities in connection with the double refraction variation stemming from the temperature variation and the temperature dependence of double refraction is offset in the doubly refracting crystal group 3 (5) as a whole, the degradation of characteristic does not occur due to temperature variation. Yet moreover, since the Faraday rotator 41 is employed as the variable optical rotator 4, a high long-term stability is attainable and a high-speed variable DGD compensator is realizable.

Figure 7:
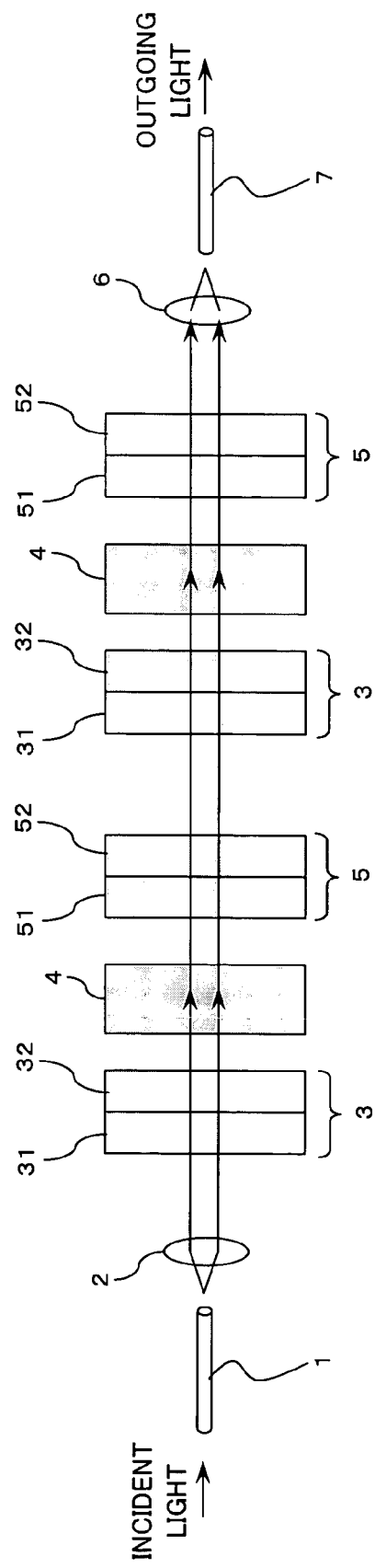
FIG. 7 is a block diagram showing a modification of the DGD compensator shown in FIG. 1.

Incidentally, in the configuration shown in FIG. 1, it is also appropriate that, as shown in FIG. 7, one or more sets each comprising a doubly refracting crystal group 3, a variable optical rotator 4 and a doubly refracting crystal group 5 are additionally provided between the output side doubly refracting crystal group 5 and the collective lens 6. In comparison with only one set, the employment of a plurality of sets of doubly refracting crystal groups 3, variable optical rotators 4 and doubly refracting crystal groups 5 enables finer adjustment of compensation quantity.

However, in FIG. 7, it is also acceptable that the doubly refracting crystal group 3 of the second set is omitted so that one or more sets comprising at least the variable optical rotator 4 and the doubly refracting crystal group 5 are provided therein. In either case, the optical axis of the doubly refracting crystal group 5 is set to perpendicularly intersect the traveling direction of the inputted light so that the intersecting polarization components are not spatially separated from each other.

In addition, although in the above-described example the lengths of the doubly refracting crystal groups 3 and 5 in the optical-axis direction are set to be equal (L) to each other (that is, the same delay quantities) in order to obtain a delay quantity in a range of 0 to $\tau$, it is not always required to set them at the same lengths if there is no need to place the delay quantity in the aforesaid range.

[B] Description of Second Embodiment

Figure 8:
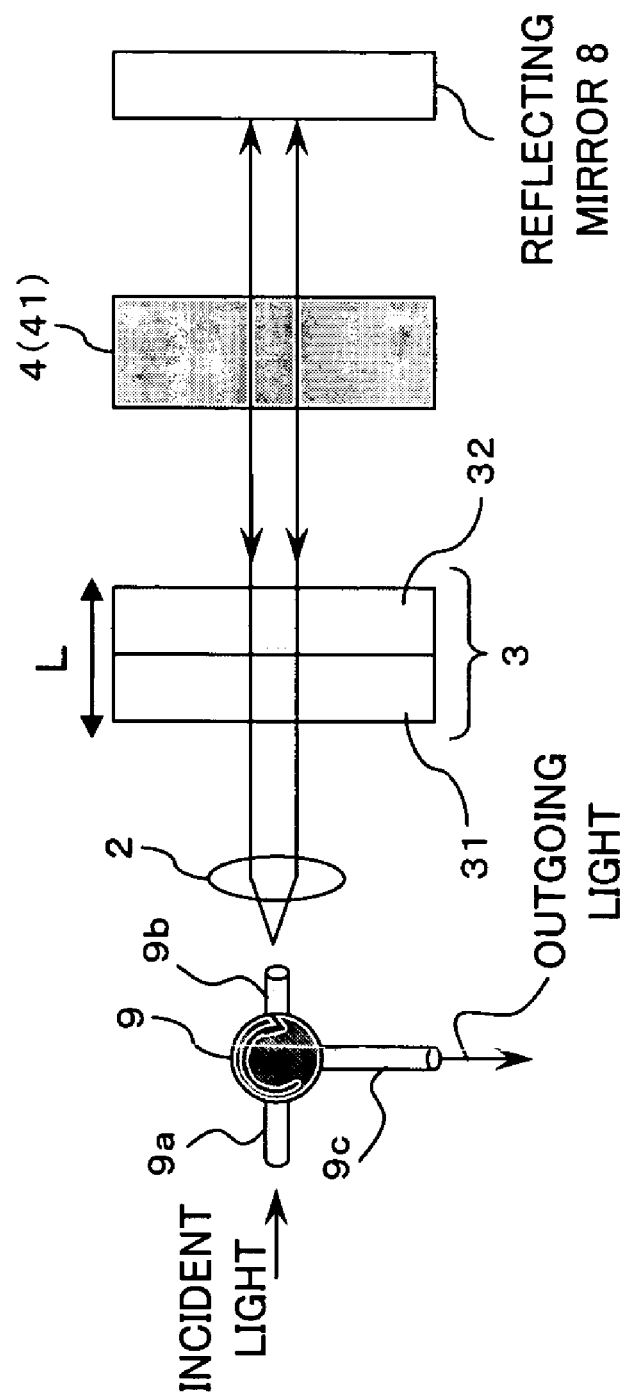
FIG. 8 is a block diagram showing a configuration of a reflection type variable DGD compensator (variable optical delay circuit) according to a second embodiment of the present invention.

FIG. 8 is a block diagram showing a configuration of a variable DGD compensator (variable optical delay circuit) according to a second embodiment of the present invention. The variable DGD compensator shown in FIG. 8 is made up of an optical circulator 9, a collimating lens 2, a doubly refracting crystal group 3 (doubly refracting crystals 31 and 32), a variable optical rotator 4 (variable Faraday rotator 41) and a reflecting mirror 8, with these components being disposed on the same optical axis. Each of the collimating lens 2, the doubly refracting crystal group 3 and the variable optical rotator 4 is identical or similar to that mentioned in the first embodiment.

That is, also in this case, the doubly refracting crystal group 3 is constructed by combining two doubly refracting crystals 31 and 32 respectively showing positive and negative polarities in connection with the double refraction variation stemming from the temperature variation and the temperature dependence of double refraction is offset in the doubly refracting crystal group 3 as a whole, and the respective doubly refracting crystals 31 and 32 are disposed so that the anisotropic axes (optical axes) thereof coincide with each other. Moreover, the optical axis of the doubly refracting crystal group 3 is set to perpendicularly intersect the inputted light.

In this configuration, the optical circulator 9 has three ports 9a, 9b and 9c each of which is connected to an optical fiber and has a function whereby the light incident on the port 9a is outputted to the port 9b (collimating lens 2 side) and the light incident on the port 9b is outputted to the port 9c. Moreover, the reflecting mirror 8 is for again reflecting the light, emitted from the variable optical rotator 4, through the same path as the incidence path toward the variable optical rotator 4 and the doubly refracting crystal group 3.

In the case of this configuration, the incident light suffering DGD goes through the port 9a of the optical circulator 9 to the port 9c and successively passes through the collimating lens 2, the doubly refracting crystal group 3 and the variable optical rotator 4 and is then reflected by the reflecting mirror 8 to propagate through the same path as the incidence path in the opposite direction, and finally goes through the port 9c of the optical circulator 9 to the port 9b thereof before outputted.

Therefore, in this case, the incident light suffering DGD to-and-fro-travels along the same optical axis in the same doubly refracting crystal group 3 without undergoing the spatial separation between the intersecting polarization components. In consequence, in a case in which the optical rotation angle of the variable optical rotator 4 is 0 degree, like the case shown in FIG. 3, the maximum delay quantity τ is obtainable, and when the optical rotation angle (polarization angle of incident light and outgoing light) is ±90 degrees, like the case shown in FIG. 4, the minimum delay quantity τ=0 is attainable.

In this connection, owing to the non-reciprocity of the variable optical rotator 4 (Faraday rotator 41), the incident light with a polarization angle of θ is reflected at a polarization angle of 2θ.

As described above, with the reflection type variable DGD compensator according to this embodiment, since, through the use of the reflecting mirror 8, the incident light is made to to-and-fro-travels along the same optical axis in the same doubly refracting crystal group 3, the same effects as those of the first embodiment are attainable, and it is possible to reduce the characteristic degradation (shifting from the delay range of 0 to τ) resulting from a difference in length (in the optical-axis direction) between the doubly refracting crystal groups 3 and 5 in the first embodiment. Moreover, the number of parts is reducible, which contributes greatly to the cost reduction.

Figure 9:
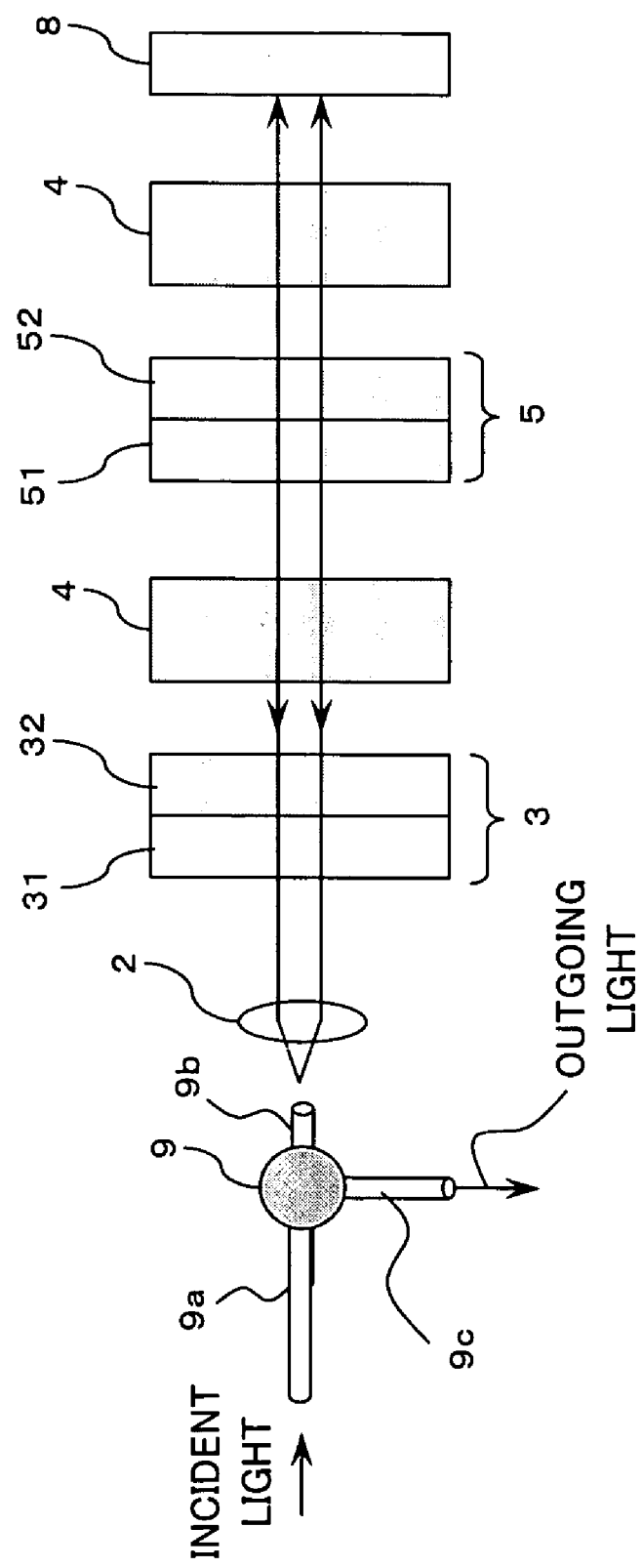
FIG. 9 is a block diagram showing a modification of the reflection type variable DGD compensator shown in FIG. 8.
Figure 10:
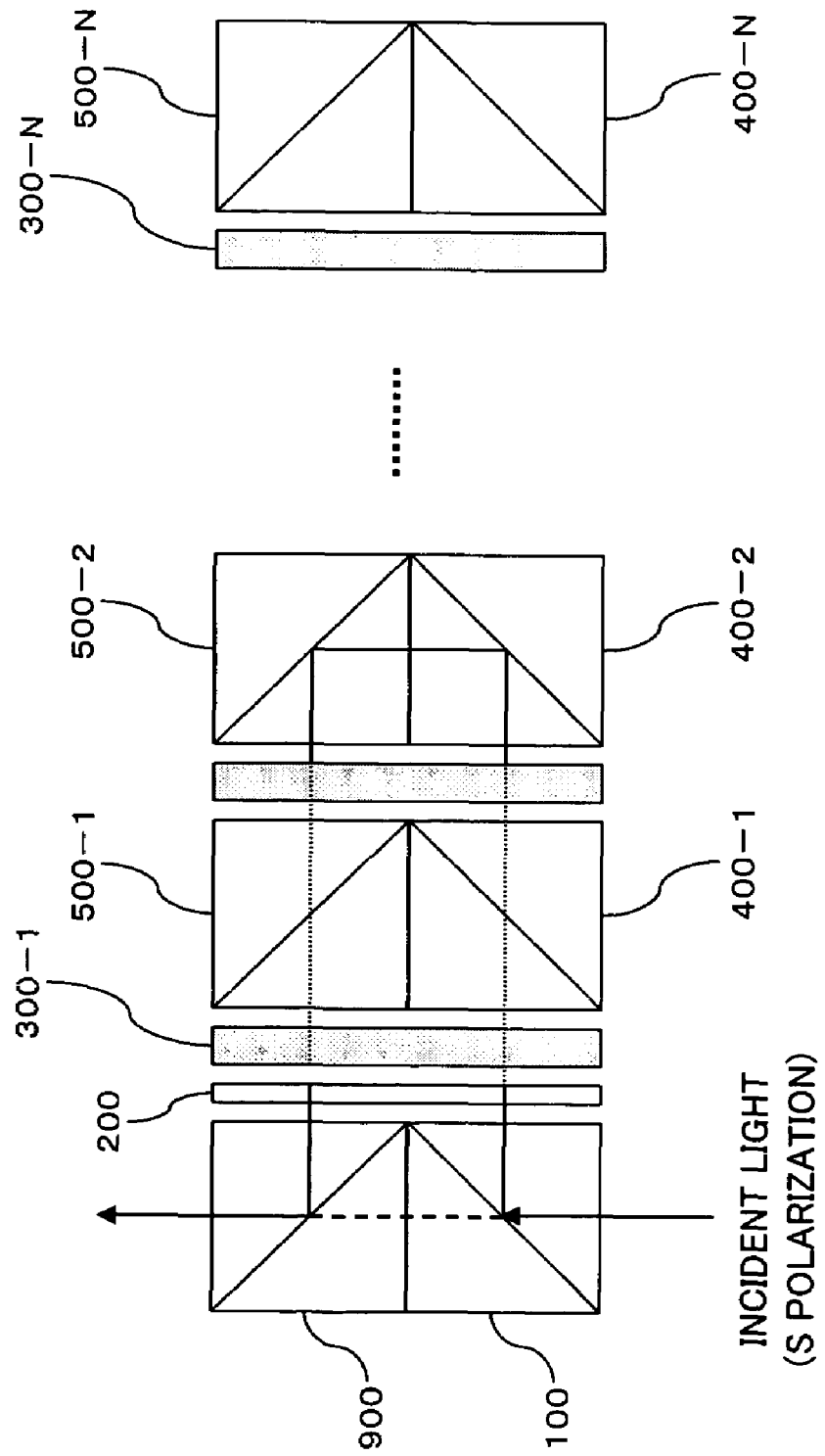
FIG. 10 is a block diagram showing a configuration of a conventional variable optical delay circuit.
Figure 11:
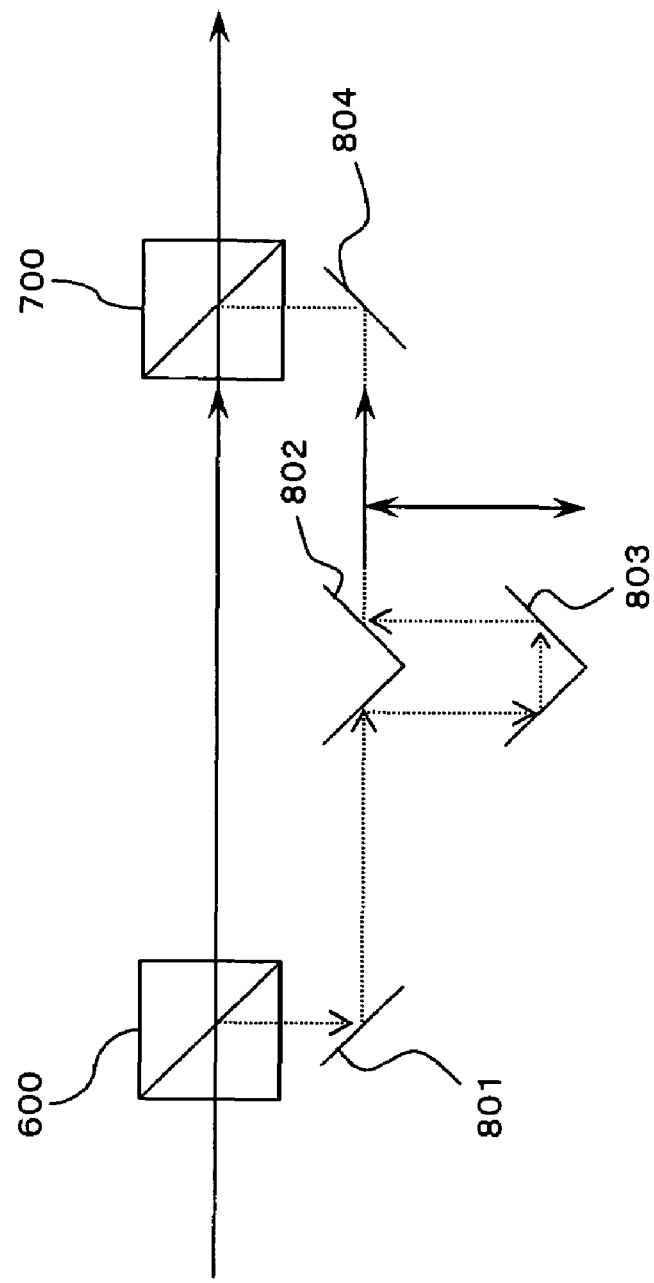
FIG. 11 is a block diagram showing a different configuration of the conventional optical delay circuit.
Figure 12:
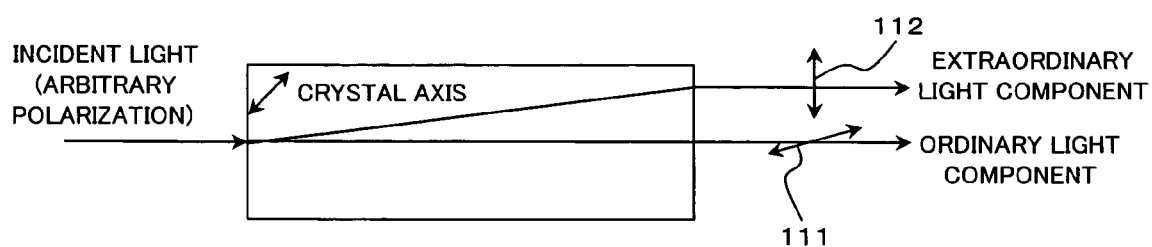
FIG. 12 is a block diagram for explaining a characteristic of a doubly refracting crystal.

Incidentally, also in the case of the second embodiment, for example, it is also appropriate that, as shown in FIG. 9, one or more sets each comprising a doubly refracting crystal group 3 and a variable optical rotator 4 are additionally provided between the aforesaid variable optical rotator 4 and the aforesaid reflecting mirror 8. This also enables finer adjustment of delay quantity.

[C] Others

Although in the above-described embodiments a variable Faraday rotator is used as the variable optical rotator 4, the present invention is not limited to this, but a device capable of equally varying the polarization state of incident light is also applicable.

In addition, although in each of the above-described first and second embodiments each of the doubly refracting crystal groups 3 and 5 acting as the birefringent members is constructed with a set of two doubly refracting crystals 31 and 32 or 51 and 52, the present invention is not limited to this, but it is also appropriate that one doubly refracting crystal group 3, 5 is constructed with a set of three or more doubly refracting crystals if it can bear a characteristic to achieve the cancellation of the double refraction variation stemming from temperature variation as a whole. Under the environments where the temperature variation can be disregarded, it is also acceptable that each birefringent member is constructed with a single doubly refracting crystal.

Furthermore, it should naturally be understood that the present invention is intended to cover all changes and modifications herein which do not constitute departures from the spirit and scope of the present invention.

As described above, according to the present invention, it is possible to realize a high-speed variable optical delay circuit which can vary the delay quantity in a continuous fashion, provide a high long-term stability and prevent the occurrence of difference in loss between lights different in polarization state, thus enabling the polarization mode dispersion compensation in an optical communication system to be carried out with high accuracy and high stability and at a high speed, Therefore, it can be considered that the variable optical delay circuit has an extremely high availability.

What is claimed is:

1. A variable optical delay circuit, comprising:
   a first birefringent member;
   a second birefringent member; and
   a variable optical rotator provided between said first birefringent member and said second birefringent member for varying a polarization state of an outputted light from said first birefringent member, said birefringent members and said variable optical rotator being disposed on the same optical axis, and each of optical axes of said birefringent members being set so as to perpendicularly or almost perpendicularly intersect a traveling direction of inputted light.

2. The variable optical delay circuit according to claim 1, wherein said first birefringent member is constructed as a doubly refracting crystal group having two or more doubly refracting crystals, and said doubly refracting crystals have a characteristic to cancel a variation of double refraction stemming from temperature variation as a whole.

3. The variable optical delay circuit according to claim 1, wherein said second birefringent member is constructed as a doubly refracting crystal group having two or more doubly refracting crystals, and said doubly refracting crystals have a characteristic to cancel a variation of double refraction stemming from temperature variation as a whole.

4. The variable optical delay circuit according to claim 1, wherein one or more sets each comprising a different variable optical rotator and a different birefringent member are provided on said optical axis at a latter stage of said second birefringent member so that an optical axis of said different birefringent member is disposed so as to perpendicularly or almost perpendicularly intersect a traveling direction of inputted light.

5. The variable optical delay circuit according to claim 1, wherein said variable optical rotator includes:
   a Faraday rotator;
   a permanent magnet for generating a parallel magnetic field in a direction parallel to an optical axis of said Faraday rotator; and
   an electromagnet for generating a perpendicular magnetic field in a direction perpendicular to said optical axis of said Faraday rotator, and
   wherein said variable optical rotator is constructed in such a manner that a polarization state of inputted light is made variable by controlling a strength of a synthetic magnetic field of said parallel magnetic field and said perpendicular magnetic field through the use of a drive current directed at said electromagnetic.

6. The variable optical delay circuit according to claim 5, wherein a magnetization to be made in an optical-axis direction by said permanent magnet is set to reach a saturation.

7. A variable optical delay circuit, comprising:
a birefringent member;
a variable optical rotator for varying a polarization state of an outputted light from said birefringent member; and
a reflecting mirror for reflecting an outputted light from said variable optical rotator toward said variable optical rotator and said birefringent member,
said birefringent member, said variable optical rotator and said reflecting mirror being disposed on the same optical axis, and an optical axis of said birefringent member being set so as to perpendicularly or almost perpendicularly intersect a traveling direction of inputted light.

8. The variable optical delay circuit according to claim 7, wherein said birefringent member is constructed as a doubly refracting crystal group having two or more doubly refracting crystals, and said doubly refracting crystals have a characteristic to cancel a variation of double refraction stemming from temperature variation as a whole.

9. The variable optical delay circuit according to claim 7, wherein one or more sets each comprising a different birefringent member and a different variable optical rotator are provided on said optical axis between said variable optical rotator and said reflecting mirror, and an optical axis of said different birefringent member is disposed so as to perpendicularly or almost perpendicularly intersect a traveling direction of inputted light.

10. A variable optical delay apparatus comprising:
a first birefringent member receiving a light and separating the received light into first and second polarization components perpendicular to each other in accordance with a crystal axis of the first birefringent member; and
a variable optical rotator rotating polarization of the first and second polarization components; and
a second birefringent member receiving the polarization rotated first and second polarization components and transmitting therethrough the received polarization rotated first and second polarization components in accordance with a crystal axis of the second birefringent member, wherein
the first birefringent member, the variable optical rotator and the second birefringent member are disposed on a same optical axis,
the crystal axis of the first birefringent member is disposed with respect to said same optical axis so that the first and second polarization components are not spatially separated from each other by the first birefringent member, and
the crystal axis of the second birefringent member is disposed with respect to said same optical axis so that the polarization rotated first and second polarization components are not spatially separated from each other by the second birefringent member.

* * * * *